United States Patent Office 2,726,245
Patented Dec. 6, 1955

2,726,245

SUBSTITUTED TROPIC ACID N-(γ-PICOLYL)-AMIDES AND PROCESS FOR THE MANUFACTURE THEREOF

Gérald Rey-Bellet and Hans Spiegelberg, Basel, Switzerland, assignors to Hoffmann-La Roche Inc., Nutley, N. J., a corporation of New Jersey No Drawing. Application September 24, 1953, Serial No. 382,213

Claims priority, application Switzerland October 24, 1952

5 Claims. (Cl. 260—295)

Substituted tropic acid amides, more particularly those of the following formula

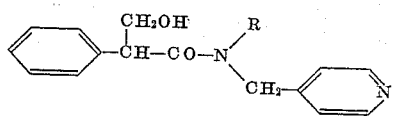

wherein R stands for a methyl, ethyl or allyl radical, have been found to be valuable drugs. Thus, the said compounds possess excellent spasmolytic properties and are of low toxicity for humans and animals. These drugs show a marked antiacetylcholine action, especially in Kühl's blood pressure test on cats.

The above mentioned novel compounds may be prepared according to the present invention by condensation of tropic acid chloride with methyl-, ethyl-, or allyl-(γ-picolyl)-amine or by condensation of acetyl-tropic acid chloride with ethyl-, methyl- or allyl-(γ-picolyl)-amine and subsequently splitting off the acetyl group. The said novel compounds may be reacted with acids to form acid addition salts, such as for example the hydrochloride, the hydrobromide, the sulfate.

The substituted γ-picolyl-amines, used as starting material, may be obtained for example by reacting a 4-halogeno-methyl-pyridine with methyl, ethyl or allylamine or by reacting N-(p-toluene-sulphonyl)-4-aminomethyl-pyridine with a methyl, ethyl or allyl halide or with the corresponding sulfate and subsequent deacylation.

Example 1

A solution of 82 parts by weight of γ-chloromethyl-pyridine-hydrochloride in 60 parts of water is added dropwise to 250 parts by weight of a 50% aqueous methylamine solution, the temperature being maintained between —10 and —5° C. Stirring is continued for two hours at 20–25° C. and for one hour at 60° C., whereupon the mixture is cooled down and saturated in the cold with solid potassium hydroxide. The mixture is extracted with ether and, after having distilled off the ether, the residue is distilled; the methyl-(γ-picolyl)-amine, a water-like liquid, boils at 95–96° C. under a pressure of 13 mm. Hg; its dihydrochloride melts at 231–233° C.

To a mixture of 34.3 parts by weight of methyl-(γ-picolyl)-amine and 28 parts by weight of dry pyridine in 225 parts by weight of dry chloroform, acetyl-tropic acid chloride prepared from 45 parts by weight of tropic acid are slowly added, while stirring and cooling with ice water. To complete the reaction, the mixture is then stirred for an additional hour at 25° C. The chloroform solution is then diluted with 200 parts by weight of ether and agitated with 3 N hydrochloric acid. The weakly Congo acid solution is heated for 1 hour in the steam bath, the acetyl group of the reaction product being thereby split off. The mixture is filtered over charcoal and concentrated ammonia is added in excess. The condensation product precipitated is taken up in chloroform, whereupon the chloroform solution is dried and concentrated. The residue is recrystallized in a mixture of ethyl acetate and low boiling petroleum ether to yield colorless crystals of tropic acid N-methyl-N-(γ-picolyl)-amide of melting point 101–102° C.

Example 2

A solution of 82 parts by weight of γ-chloromethyl-pyridine-hydrochloride in 60 parts of water is added dropwise, at 0–5° C., to 250 parts by weight of a 50% aqueous ethyl amine solution. The mixture is stirred for 1 hour at 60° C., whereupon it is cooled down and separated in the cold with solid potassium hydroxide. The oil formed is separated off, dried over potassium hydroxide and distilled. The ethyl-(γ-picolyl)-amine formed boils over at 103–104° C. under a pressure of 13 mm. Hg. Its dihydrochloride melts at 198–200° C.

To a mixture of 48.7 parts by weight of ethyl-(γ-picolyl)-amine and 36 parts by weight of dry pyridine in 220 parts by weight of dry chloroform is slowly added, while stirring and cooling with ice water, crude acetyltropic acid chloride, prepared from 60 parts by weight of tropic acid. To complete the reaction, the mixture is stirred for one additional hour at 23° C. Thereupon the chloroform solution is diluted with 200 parts by weight of ether and agitated with 3 N hydrochloric acid. The weakly Congo acid solution is heated for 1 hour in a steam bath, the acetyl group of the reaction product being thereby split off, and the mixture is filtered over charcoal. Upon adding concentrated ammonia in excess, the condensation product separates and is taken up in chloroform. The chloroform solution is dried and distilled, the tropic acid N-ethyl-N-(γ-picolyl)-amide being thereby obtained in the form of a thick oil, which crystallizes after prolonged time and which then melts at 96–97° C.

Example 3

A solution of 82 parts by weight of γ-chloromethyl-pyridine-hydrochloride in 60 parts of water is added dropwise to 175 parts by weight of pure allyl amine. The temperature is maintained below 10° C. by means of an ice water bath. The mixture is then stirred for 2 hours at 25° C. and for 1 hour at 50° C., it is cooled down and saturated in the cold with solid potassium hydroxide. The oily layer formed is separated, dried with solid potassium hydroxide and distilled, the allyl-(γ-picolyl)-amine formed boiling over at 120–121° C. under a pressure of 13 mm. Hg; the dihydrochloride thereof melts at 184–185° C.

To a mixture of 50 parts by weight of allyl-(γ-picolyl)-amine and 30.5 parts by weight of dry pyridine in 200 parts by weight of dry chloroform, crude acetyl-tropic acid chloride, prepared from 57.5 parts by weight of tropic acid, is slowly added while stirring and cooling with ice water. The reaction is completed by stirring for additional 90 minutes at 25° C. Thereupon, the chloroform solution is diluted with 200 parts by weight of ether and agitated with 3 N hydrochloric acid. The weakly Congo acid solution is heated for 1 hour in a steam bath to split off the acetyl group of the reaction product, the mixture is filtered over charcoal and concentrated ammonia is added in excess. The condensation product formed is extracted with chloroform, the chloroform extract is dried and concentrated. The tropic acid N-allyl-N-(γ-picolyl)-amide is a thick oil, the hydrochloride of which melts at 64–66° C.

Example 4

To a mixture of 27.2 parts by weight of ethyl-(γ-picolyl)-amine (Example 2) and 21 parts by weight of triethyl amine in 300 parts by weight of dry chloroform is added dropwise, while stirring, crude tropic acid chloride prepared from 33.2 parts by weight of tropic acid. The temperature is thereby maintained below 20° C. by cooling with an ice water bath. Once the reaction is complete, the chloroform solution is washed with water, diluted with 200 parts by weight of ether and agitated with 3 N hydrochloric acid. The hydrochloric acid solution is filtered over charcoal and, in the cold, concentrated ammonia is added in excess, the tropic acid N-ethyl-N-(γ-picolyl)-amide precipitating thereby. The latter is taken up in chloroform, the chloroform solution is dried over sodium sulphate and the chloroform is distilled off. The residue is recrystallized in a mixture of ethyl acetate and petroleum ether to yield colorless crystals of tropic acid N-ethyl-N-(γ-picolyl)-amide of melting point 96–97° C. The hydrobromide melts at 147–149° C., the hydrochloride at 123–125° C.

We claim:

1. A process for the manufacture of substituted tropic acid N-(γ-picolyl)-amides and acid addition salts thereof which comprises reacting acetyl tropic acid chloride, with a member of the group consisting of methyl-(γ-picolyl)-amine, ethyl-(γ-picolyl)-amine and allyl-(γ-picolyl)-amine and, hydrolyzing off the acetyl group.

2. A process according to claim 1, which comprises reacting acetyl-tropic acid chloride with methyl-(γ-picolyl)-amine and treating the condensation product formed with an acid to form tropic acid N-methyl-(γ-picolyl)-amide.

3. A process according to claim 1, which comprises reacting acetyl-tropic acid chloride with ethyl-(γ-picolyl)-amine and treating the condensation product formed with an acid to form tropic acid N-ethyl-(γ-picolyl)-amide.

4. A process according to claim 1, which comprises reacting acetyl-tropic acid chloride with allyl-(γ-picolyl)-amine and treating the condensation product formed with an acid to form tropic acid N-allyl-(γ-picolyl)-amide.

5. A compound selected from the group consisting of tropic acid N-methyl-N-(γ-picolyl)-amide, tropic acid N-ethyl-N-(γ-picolyl)-amide, tropic acid N-allyl-N-(γ-picolyl)-amide and the acid addition salts thereof.

References Cited in the file of this patent

UNITED STATES PATENTS

| | | |
|---|---|---|
| 2,647,904 | Rey-Bellet | Aug. 4, 1953 |
| 2,677,689 | Rey-Bellet | May 4, 1954 |